United States Patent
Han et al.

(10) Patent No.: US 9,761,928 B2
(45) Date of Patent: Sep. 12, 2017

(54) MOBILE TERMINAL AND COIL ANTENNA MODULE

(71) Applicant: LG ELECTRONICS INC., Seoul (KR)

(72) Inventors: Kiwon Han, Seoul (KR); Youngtae Kim, Seoul (KR); Gwanghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/952,803

(22) Filed: Nov. 25, 2015

(65) Prior Publication Data

US 2016/0261026 A1  Sep. 8, 2016

Related U.S. Application Data

(60) Provisional application No. 62/128,506, filed on Mar. 4, 2015.

(30) Foreign Application Priority Data

Mar. 24, 2015 (KR) .................. 10-2015-0041004
Apr. 7, 2015 (KR) .................. 10-2015-0048991

(51) Int. Cl.
*H04B 5/00* (2006.01)
*H01Q 1/24* (2006.01)
(Continued)

(52) U.S. Cl.
CPC .............. *H01Q 1/243* (2013.01); *H01Q 7/06* (2013.01); *H01Q 9/04* (2013.01); *H04B 1/3888* (2013.01);
(Continued)

(58) Field of Classification Search
None
See application file for complete search history.

(56) References Cited

U.S. PATENT DOCUMENTS 6,839,963 B1  1/2005  Haghiri-Tehrani et al.
8,628,012 B1  1/2014  Wallner
(Continued)

FOREIGN PATENT DOCUMENTS

JP   2011066744        3/2011
JP   EP 2894757 A1 *   7/2015  .............. H02J 17/00
(Continued)

OTHER PUBLICATIONS

European Patent Office Application Serial No. 15195835.2, Search Report dated Jul. 6, 2016, 8 pages.
(Continued)

*Primary Examiner* — Mohammed Rachedine
(74) *Attorney, Agent, or Firm* — Lee Hong Degerman Kang & Waimey

(57) ABSTRACT

There is disclosed a mobile terminal including a first case comprising a battery loading portion, a battery loaded in the battery loading portion, a second case coupled to the first case and configured to cover the battery, a coil antenna module arranged between the second case and the battery, and a controller electrically connected to the coil antenna module and configured to transmit and receive a signal or receive an electric power, wherein the coil antenna module includes an insulating sheet, a first coil arranged in a surface of the insulating sheet, a second coil arranged in the first coil, a third coil arranged in the second coil, and a magnetic sheet disposed on the surface of the insulating sheet, and ends of the first, second and third coils are arranged in the surface of the insulating sheet or dividedly arranged in both surfaces of the insulating sheet. The mobile terminal may realize the coil antenna module including a plurality of coils (Continued)

configured to perform diverse manners of wireless communication in a limited area.

20 Claims, 11 Drawing Sheets

(51) Int. Cl.
*H01Q 7/06* (2006.01)
*H01Q 9/04* (2006.01)
*H04B 1/3888* (2015.01)

(52) U.S. Cl.
CPC ......... *H04B 5/0031* (2013.01); *H04B 5/0037* (2013.01); *H04B 5/0081* (2013.01); *H04B 5/0087* (2013.01)

(56) References Cited

U.S. PATENT DOCUMENTS

| | | | |
|---|---|---|---|
| 8,690,059 B1 | 4/2014 | Wallner | |
| 8,814,046 B1 | 8/2014 | Wallner | |
| 2006/0266435 A1* | 11/2006 | Yang | G06K 19/07771 148/105 |
| 2011/0156640 A1 | 6/2011 | Moshfeghi | |
| 2013/0267170 A1 | 10/2013 | Chong et al. | |
| 2014/0210406 A1* | 7/2014 | Na | H02J 7/025 320/108 |
| 2014/0269946 A1 | 9/2014 | Wallner | |

FOREIGN PATENT DOCUMENTS

| | | |
|---|---|---|
| KR | 10-2006-0044182 | 5/2006 |
| KR | 10-2009-0034749 | 4/2009 |
| KR | 10-2011-0035196 | 4/2011 |
| KR | 10-2012-0100714 | 9/2012 |
| KR | 10-2013-0016588 | 2/2013 |
| KR | 10-2013-0024757 | 3/2013 |
| KR | 10-2013-0045306 | 5/2013 |
| KR | 10-2013-0102218 | 9/2013 |
| KR | 10-2014-0101665 | 8/2014 |
| KR | 10-2014-0121200 | 10/2014 |
| KR | 10-2014-0124851 | 10/2014 |
| KR | 10-2014-0146530 | 12/2014 |
| KR | 10-2015-0014696 | 2/2015 |
| KR | 10-2015-0051902 | 5/2015 |
| WO | 2014/113278 | 7/2014 |

OTHER PUBLICATIONS

"Samsung is a partnership LoopPay Service?" http://stevejeon.tumblr.com/post/105836390104/looppay, Dec. 21, 2014, 1 page.
"Samsung Pay in Action," http://www.nfcworld.com/2015/03/02/334422/video-shows-samsung-pay-in-action/, Mar. 2, 2015, 1 page.
PCT International Application No. PCT/KR2015/008510, Written Opinion of the International Searching Authority dated Dec. 3, 2015, 10 pages.

\* cited by examiner (a)

(b)

(a)

(b)

MOBILE TERMINAL AND COIL ANTENNA MODULE

CROSS-REFERENCE TO RELATED APPLICATIONS

Pursuant to 35 U.S.C. §119, this application claims the benefit of earlier filing date and right of priority to Korean Application Nos. 10-2015-0041004, filed on Mar. 24, 2015, and 10-2015-0048991, filed on Apr. 7, 2015, and also claims the benefit of U.S. Provisional Application No. 62/128,506, filed on Mar. 4, 2015, the contents of which are all incorporated by reference herein in their entirety.

BACKGROUND OF THE DISCLOSURE

Field of the Disclosure

Embodiments of the present disclosure relate to a mobile terminal which may facilitate wireless communication and wireless charging, and a control method thereof.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Moreover, the functions can be improved as such the mobile terminal transmit and receive information, using an external device and wireless communication. Specific functions of the mobile terminal may be implemented such as data transmission between terminals. By extension, payment settlement may be processed, using the mobile terminal.

As use of the mobile terminal is diversified, such the mobile terminal requires much battery use and there are increasing needs for a wireless recharge function configured to allow easy battery recharge only when the mobile terminal is located near a recharger, without an auxiliary cable.

SUMMARY OF THE DISCLOSURE

An object of the present disclosure is to provide a a coil antenna module which may facilitate various manners of wireless communication and wireless recharge, and a mobile terminal including the coil antenna module.

Embodiments of the present disclosure may provide a mobile terminal including a first case comprising a battery loading portion; a battery loaded in the battery loading portion; a second case coupled to the first case and configured to cover the battery; a coil antenna module arranged between the second case and the battery; and a controller electrically connected to the coil antenna module and configured to transmit and receive a signal or receive an electric power, wherein the coil antenna module includes an insulating sheet; a first coil arranged in a surface of the insulating sheet; a second coil arranged in the first coil; a third coil arranged in the second coil; and a magnetic sheet disposed on the surface of the insulating sheet, and ends of the first, second and third coils are arranged in the surface of the insulating sheet or dividedly arranged in both surfaces of the insulating sheet.

The controller may include frequency matching circuits connected to the ends of the first, second and third coils, respectively.

The frequency matching circuit may match the first coil with a frequency band of 13 MHz or more, the second coil with a frequency band of 100 kHz or less, and the third coil with a frequency band from 100 kHz to 300 kHz.

The frequency matching circuit may include a NFC (Near Field Communication) module comprising a circuit matching with a frequency at a high frequency band and connected to the first coil, and the frequency matching circuit may perform near field communication, using the first coil.

The frequency matching circuit may include a wireless charging module comprising a circuit matching with a frequency at a low frequency band and connected to the third coil, and the frequency matching circuit may charge the battery, using the electric power received by the third coil.

A Q-factor of the wireless charging module and a Q-factor of the third coil may be smaller than a Q-factor of the NFC module and a Q-factor of the first coil.

At least one of the first, second and third coils may include a predetermined portion arranged in one surface of the insulating sheet and the other portion arranged in the other surface of the insulating sheet, and the coils arranged in one surface and the other surface of the insulating sheet may be connected with each other via a via hole penetrating the insulating sheet.

A predetermined spiral portion of the coil formed in the surface and the coil formed in the other surface may be symmetrically formed with respect to the insulating sheet.

One integrated coil is formed by connecting an internal end of the second coil with an external end of the third coil, and the controller may include a wireless charging module comprising a matching circuit matching a frequency at a low frequency band; a mobile payment antenna module comprising a matching circuit matching a lower frequency band than the wireless charging module; and a switch module connected to an external end of the second coil and an internal end of the third coil and configured to selectively connect the wireless charging module and the mobile payment antenna module with each other.

The magnetic sheet may be a Ferrite sheet, and a magnetic permeability (μr) of the magnetic sheet at frequencies in a range from 50 kHz to 14 MHz may be 130~190.

The magnetic sheet may cover at least one of the first, second and third coils, not the ends of the first, second and third coils.

The number of the third coil windings may be larger than the number of the first coil and second coil windings.

The controller may control the first or third coil to transmit a cancellation signal configured to cancel the signal transmitted from the second coil, when the signal is transmitted from the second coil.

In another aspect of the present disclosure, a coil antenna module includes an insulating sheet; a first coil arranged in a surface of the insulating sheet; a second coil arranged in the first coil; a third coil arranged in the second coil; and a magnetic sheet disposed on the surface of the insulating sheet, and ends of the first, second and third coils are arranged in the surface of the insulating sheet or dividedly arranged in both surfaces of the insulating sheet.

The magnetic sheet may cover at least one of the first, second and third coils, not the ends of the first, second and third coils.

The third coil may be thicker than the first coil and the second coil.

At least one of the first, second and third coils may include a predetermined portion arranged in one surface of the insulating sheet and the other portion arranged in the other surface of the insulating sheet, and the coils arranged in one surface and the other surface of the insulating sheet may be connected with each other via a via hole penetrating the insulating sheet.

A predetermined spiral portion of the coil formed in the surface and the coil formed in the other surface may be symmetrically formed with respect to the insulating sheet.

The magnetic sheet may be a Ferrite sheet, and a magnetic permeability (μr) of the magnetic sheet at frequencies in a range from 50 kHz to 14 MHz may be 130 ~490.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Figure 1A:
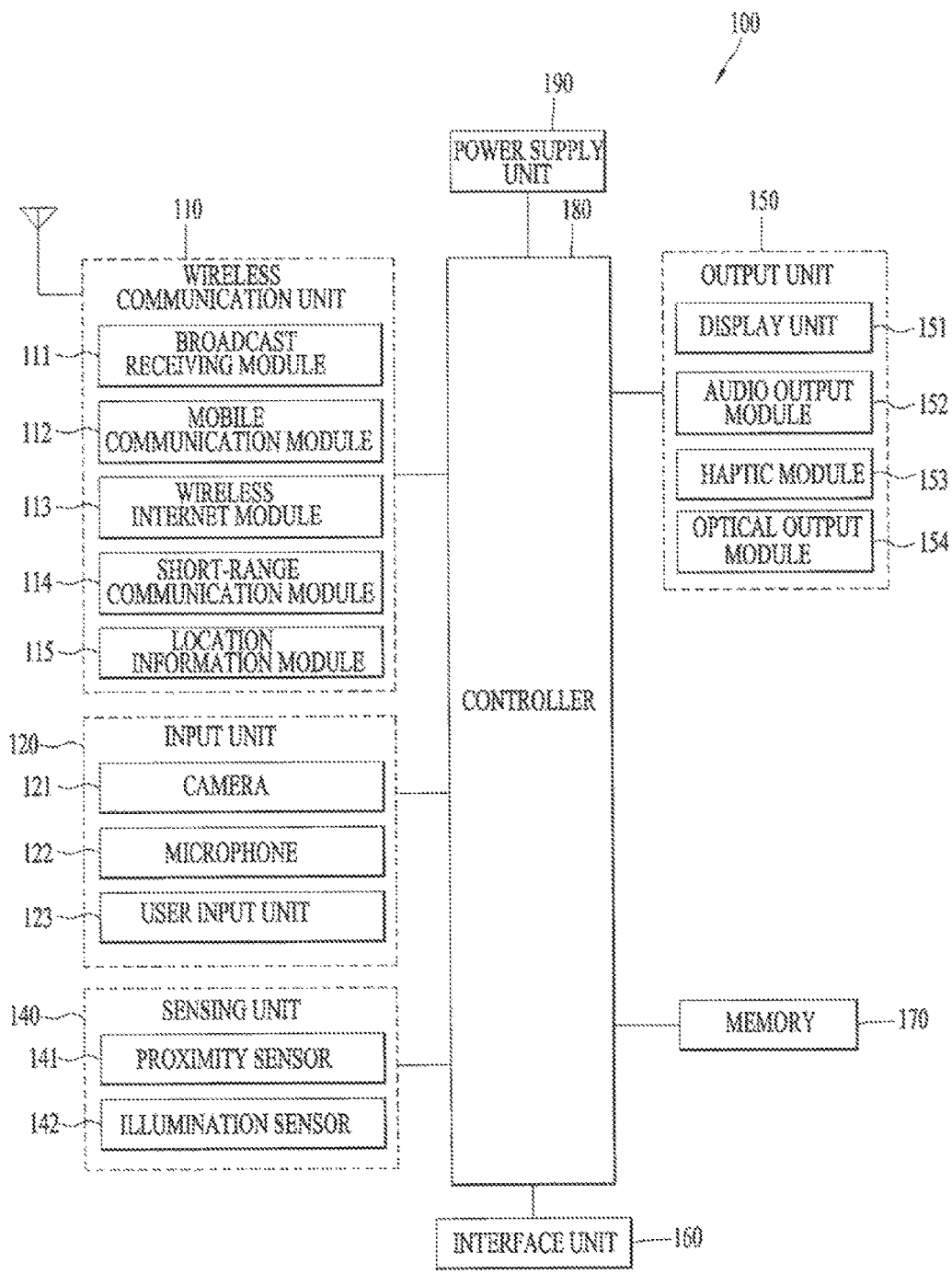
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
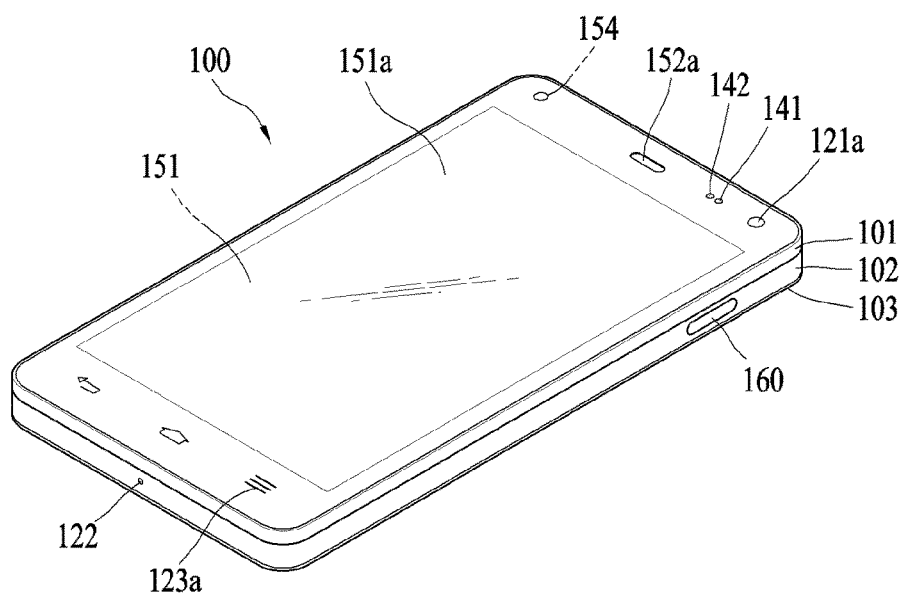
FIGS. 1B and 1C are conceptual views of one example of the mobile terminal, viewed from different directions.
Figure 1C:
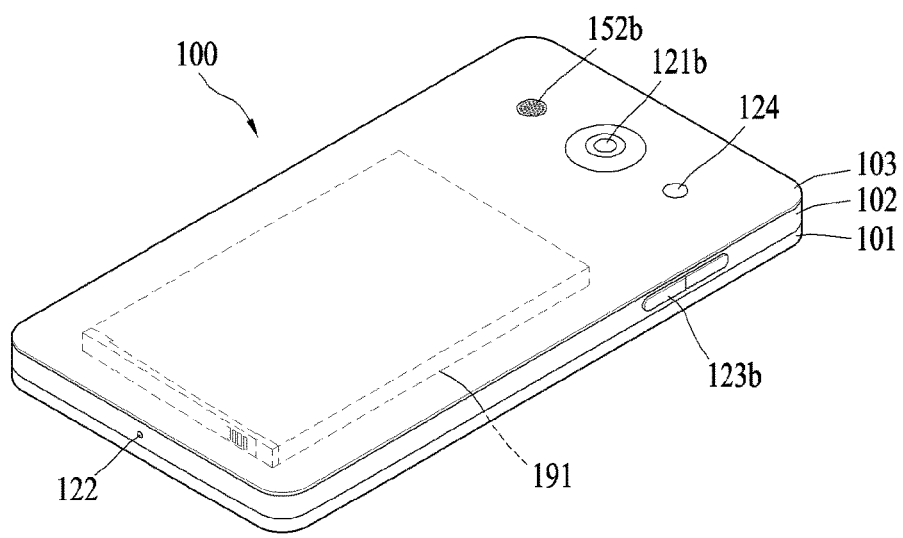

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, a sensing unit 140 may include one or more of a proximity sensor 141, an illumination sensor 142, a touch sensor, an acceleration sensor, a magnetic sensor, a G-sensor, a gyroscope sensor, a motion sensor, a RGB sensor, an IR sensor (Infrared sensor), a finger scan sensor, a ultrasonic sensor, an optical sensor (e.g., a camera 121), a microphone 122, a battery gauge, an environmental sensor (e.g., a barometer, a hygrometer, a thermometer, a radioactivity detecting sensor, a thermal sensor, a gas sensor and the like) and a chemical sensor (e.g., an electronic nose, a healthcare sensor, a biometric sensor and the like). Meanwhile, the mobile terminal disclosed in the specification may collate and use the information sensed by at least two or more of the sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of such the components may be executed in cooperation to operate and control the mobile terminal in accordance with the various embodiments which will be described hereafter or to embody a control method of such the mobile terminal. The operation, the control or the control method may be realized in the mobile terminal by the driving of one or more application programs stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In this instance, the terminal body may be understood as a concept considering the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

In the mobile terminal 100 may be provided in a display unit 151, first and second sound output units 152a and 152b, a proximity sensor 141, an illumination sensor 142, an optical output unit 154, a first and second cameras 121a and 121b, first and second manipulation units 123a and 123b, a microphone 122 and an interface unit 160.

Hereinafter, as shown in FIGS. 1b and 1c, the mobile terminal 100 having the following arrangement of the components will be described. Specifically, in a front surface of the terminal body may be arranged the display unit 151, the first sound output unit 152a, the proximity sensor 141, the illumination sensor 142, the optical output unit 154, the first camera 121a and the first manipulation unit 123a. In a lateral surface of the terminal body may be arranged the second manipulation unit 123b, the microphone 122 and the interface unit 160. In a rear surface of the terminal body may be arranged the second sound output unit 152b and the second camera 121b.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 displays (i.e., outputs) the information processed in the mobile terminal 100. For example, the display unit 151 may display execution screen information of the application program driven in the mobile terminal 100 or UI (User Interface) information and GUI (Graphic User Interface) information according to such execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen FIG. 2 is a diagram illustrating a state where a battery 191 and a coil antenna module 200 are exposed via a back cover 103 of a mobile terminal in accordance with one example of the mobile terminal 100.

The coil antenna module 200 includes a plurality of coils 221, 222 and 223 formed on an insulating sheet. The coils are arranged in a spiral with respect to one point and distances from the center to the coils are different from each other. The coil antenna module 200 may be arranged between the battery 191 and the rear case 102, in case the mobile terminal 100 is an integrated battery type. It may be arranged between the battery 191 and the back cover, in case the mobile terminal 100 is a separable battery type.

Figure 2:
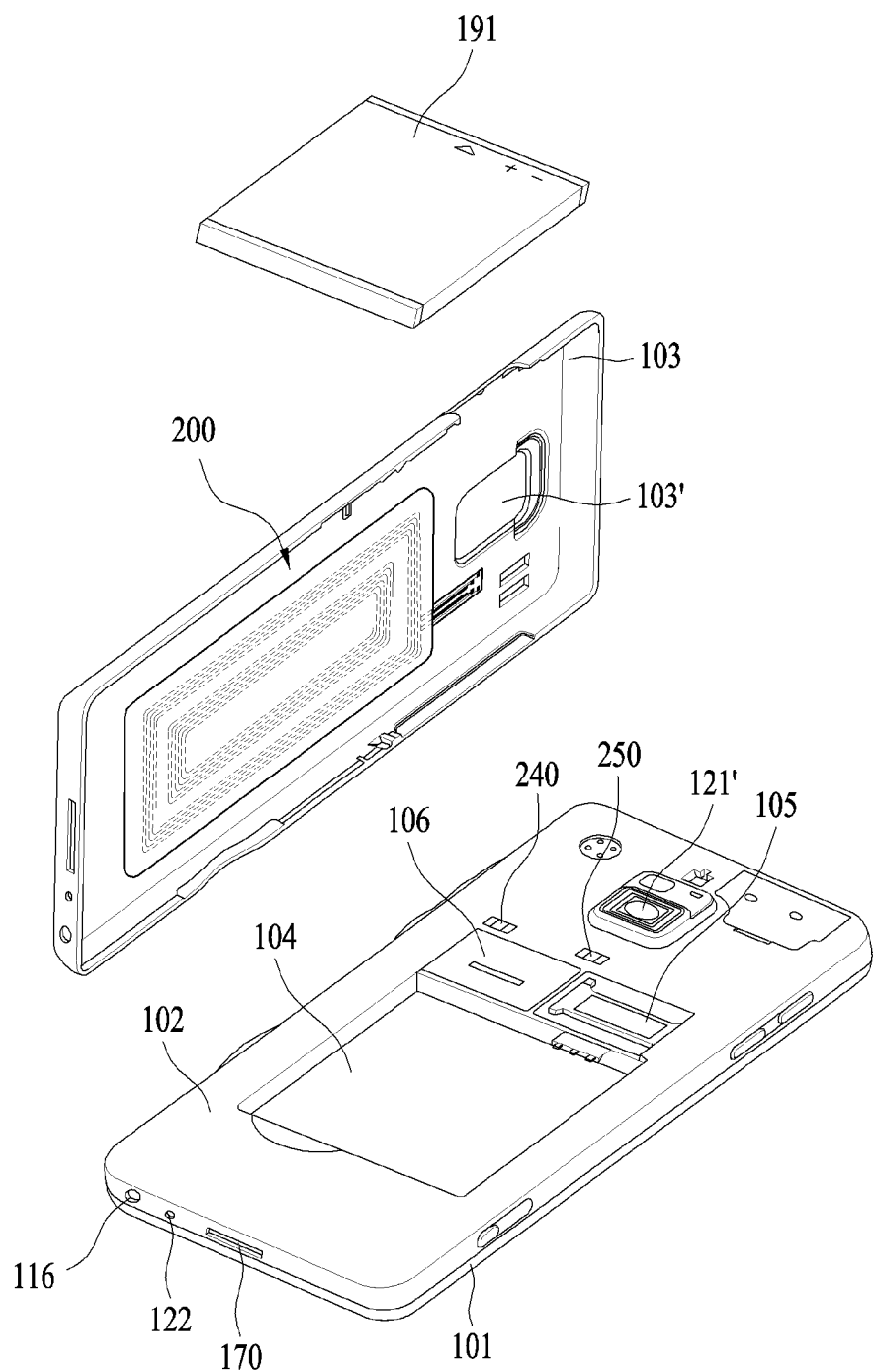
FIG. 2 is a perspective diagram illustrating a state of a back cover decoupled from the mobile terminal in accordance with the present disclosure.

FIG. 2 illustrates the state where the back cover 103 is decoupled and exposed to a rear surface of the rear case 102. In this instance, a USIM card loading portion 105, a memory card loading portion 106, a battery loading portion 104 and rear surface terminals 240 and 250 linkable with the coil antenna module 200 and the like may be provided in a rear surface of the rear case 102. When the mobile terminal 100 is an integrated battery type, the rear case 102 may not be decoupled and the USIM card loading portion 105 and the memory card loading portion 106 may be insertedly loaded in the lateral surface, not loaded in the back surface.

As the functions of the mobile terminal 100 become diversified, the functions configured to communicate with an external device and a server wirelessly are becoming more important. Also, wireless communication manners become more diversified. For such wireless communication techniques, diverse antennas may be provided.

Each of the antennas may be connected to the controller and it may match a predetermined frequency receivable and transmittable by a circuit module connected to the controller 180. The controller 180 may transmit and receive a signal via the antennas.

The coil antenna module 200 arranged between the rear cover 103 or and the rear case may be usually used in wirelessly communicating with an external device located in a near filed and it may receive the electricity provided by a wireless recharge device located in a in a near filed, rather than the signal transmission and reception.

The coil antenna module 200 includes a terminal 226 exposed outside to access to a printed circuit board (i.e., the controller 180) mounted in the case. In case the mobile terminal is the integrated battery type, the terminal 226 of the coil antenna module 200 may be connected to the printed circuit board in a manner of soldering. In case the mobile terminal is the separable battery type, the terminal 226 of the coil antenna module 200 is configured to contact with a connection pin exposed to a back side of the rear case when the rear cover 103 is coupled.

The coil antenna module 200 may be provided in a surface of the mobile terminal 100 to secure a wide area for radio wave reception and to minimize the effect of the other electronic components. Also, a magnetic sheet 230 may be further provided between the battery 191 and the coil antenna module 200 to prevent wireless communication efficiency from being deteriorated by the interference in the components mounted in the mobile terminal or to prevent errors of the components.

Figure 3:
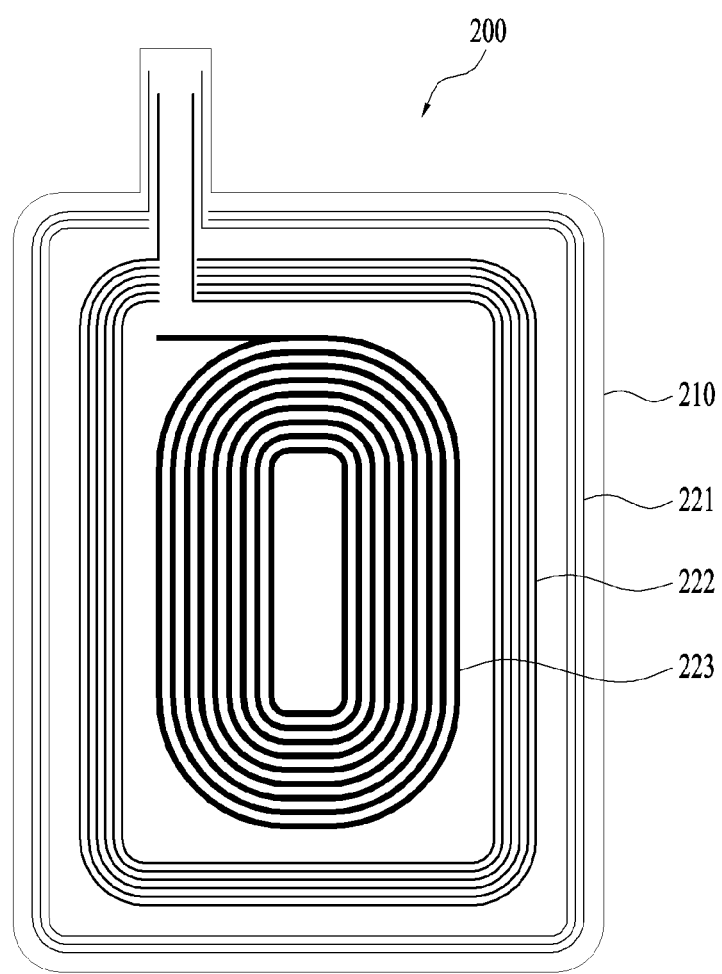
FIG. 3 is a back view of a coil antenna module in accordance with the present disclosure.
Figure 4:
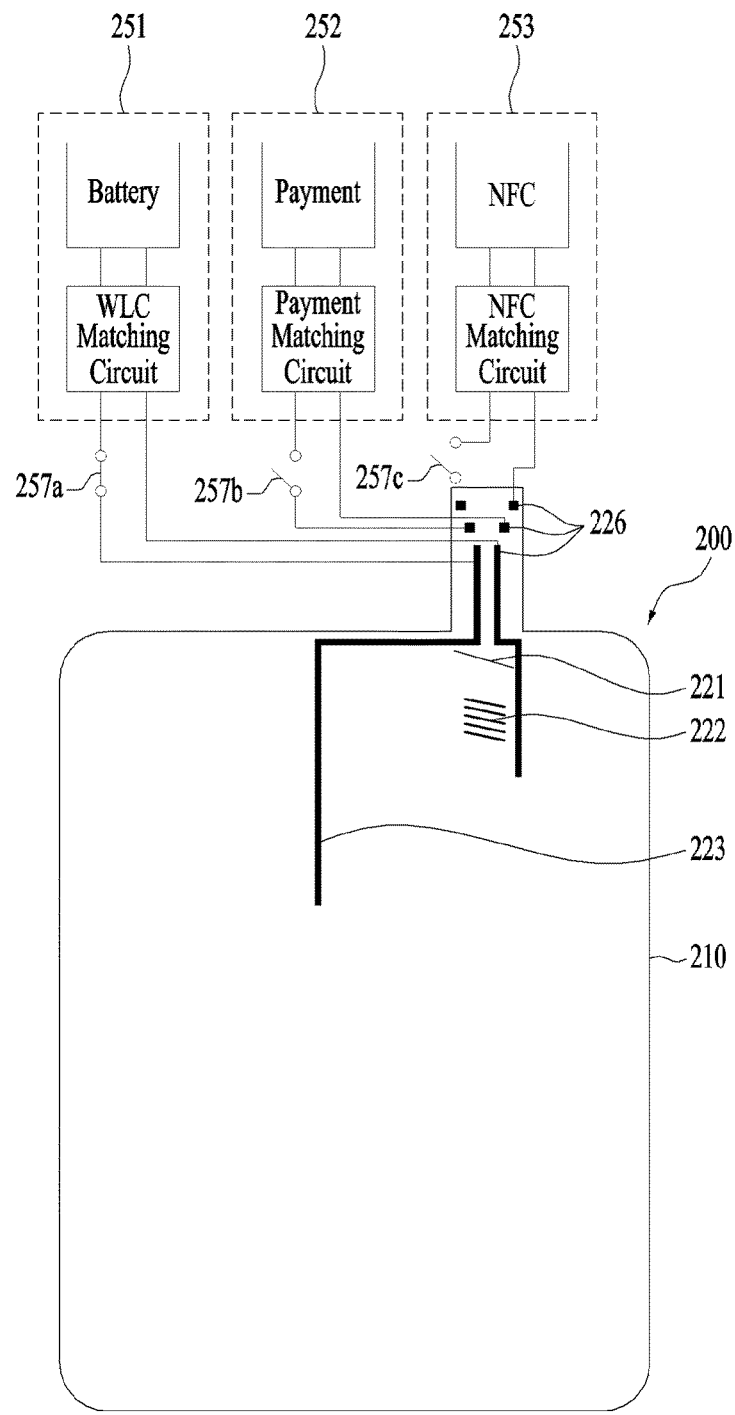
FIG. 4 is a front view of the coil antenna module in accordance with the present disclosure.

FIG. 3 is a back view of the coil antenna module 200 in accordance with the present disclosure. FIG. 4 is a front view of the coil antenna module 200 in accordance with the present disclosure.

The coil antenna module 200 may include the spiral coil 221, 222 and 223 formed in a surface of the insulating sheet 210. The coil may consist of a first coil 221 arranged in the outmost position, a third coil arranged in the innermost position and a second coil 222 arranged between the first coil 221 and the third coil 223.

Each of the coils may be connected to a frequency matching circuit provided in the controller 180. The frequency matching circuit includes a capacitor and a resistance. In other words, the frequency band of the receivable and transmittable signal may be varied according to inductance (L) of the coil, capacitance (C) of the capacitor and a reactance (R) of the resistance. The coil is functioned as inductor of a resonance circuit so that the coils may be wound different times to have optimal inductance values, respectively, and that each of the coils may have a different thickness and a different diameter.

The first coil 221 may use NFC (Near Filed Communication) as antenna. NFC supports contactless NFC (Near Field Communication) between the terminals 100 located within or out of 10 cm. NFC uses a signal at a high frequency band of 13.56 MHz, with a short communication range. Accordingly, NFC has the advantage of strong security. Only when locating the terminals close, preset functions may be executed and NFC has another advantage of easy simple use.

NFC may be operated in a card mode, a reader mode or a P2P mode. To operate NFC in the card mode, the mobile terminal 100 may further include a security module configured to store card information. In this instance, the security module may be UICC (Universe Integrated Circuit Card, e.g., SIM (Subscriber Identification Module) or USIM (Universal SIM)), Secure Micro SD, a sticker and other physical medias. Or, the security module may be a logical media embedded in the mobile terminal 100 (e.g., embedded SE (Secure element)). Data exchange based on SWP (Single Wire Protocol) may be performed between NFC and the security module.

When operating NFC in the card mode, the mobile terminal may deliver the stored card information to an external device like a conventional IC card. When operating NFC in the reader mode, the mobile terminal may read data from an external tag. When operating NFC in the P2P (Peer-to-Peer) mode, the mobile terminal may implement P2P communication with another mobile terminal and connection may be created between the mobile terminal and the mobile terminal for P2P communication.

Not only the shape of the coil but also the size and connection method of the capacitor provided in the frequency matching circuit of the controller 180 connected to the first coil may have effect on the first coil's transmission and reception of the high frequency signal such as NFC.

Figure 5:
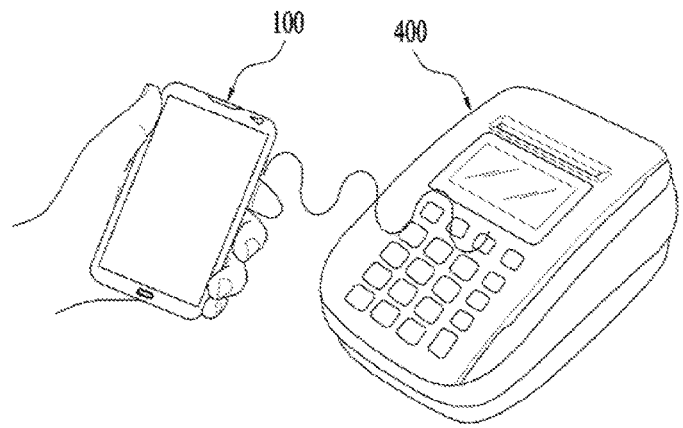
FIG. 5 is a diagram illustrating a method for processing wireless mobile payment settlement
Figure 5:
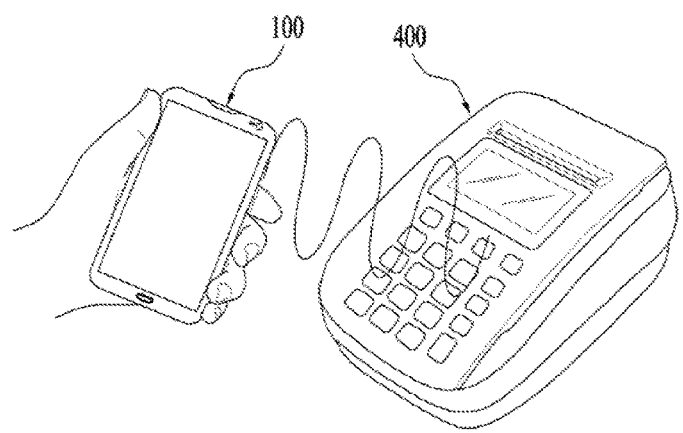

The second coil 222 may be used in mobile payment. FIG. 5 is a conceptual diagram to describe the mobile payment function of the present disclosure. Such the mobile payment function is configured to process mobile payment by transmitting a signal having payment information to a payment terminal 400. As one example of the mobile payment, the mobile terminal instead of a magnetic card transmits a signal corresponding to the magnetic variation generated in swiping a magnetic card in a card reader and processes mobile payment.

The speed of the user's card swiping in the card reader is generally 0.1 second or more and the number of the stripes provided in a magnetic band is limited, so that the frequency of the magnetic variation generated in the card swiping in the card reader may be 100 kHz or less. Accordingly, the mobile payment uses a signal at a low frequency band in a range of 100 kHz or less.

It is embodied that the first coil 221 is functioned as NFC and the second coil 222 is functioned for the mobile payment in one embodiment. However, the positions of the two coils may be reversed to function the second coil 222 as NFC and to use the first coil 221 in process the mobile payment function. When the signal for the mobile payment failed to be transmitted accurately, another signal having a stronger intensity shown in FIG. 5 (b) may be transmitted. Unless mobile payment is processed by the firstly transmitted signal, the user may touch a re-send button to set to transmit a stronger signal.

The third coil 223 is arranged in the center of the coil arrangement area and used as an electric power receiving coil for wireless electric power receiving, i.e. wireless charging. When the third coil 223 enters into a magnetic field formed in the wireless electric power receiving coil, an induced electromotive force is generated to recharge the battery 191. The location relation between the wireless electric power receiving coil of the terminal and a wireless electric power receiving coil of a wireless charger is important in the wireless electric power transmission and reception. The wireless electric power receiving coil may be arranged in the central area of the mobile terminal 100 not to be overlapped with the other coils. However, the location of the wireless electric power coil is not limited thereto and vice versa locations may be allowable.

Wireless charging technology may use frequencies at two band widths. According to WPC standard, the wireless charging technology may use frequencies at a band width from 110 kHz to 205 kHz. According to PMA standard, the wireless charging technology may use frequencies at a band width from 227 kHz to 278 kHz.

Figure 6:
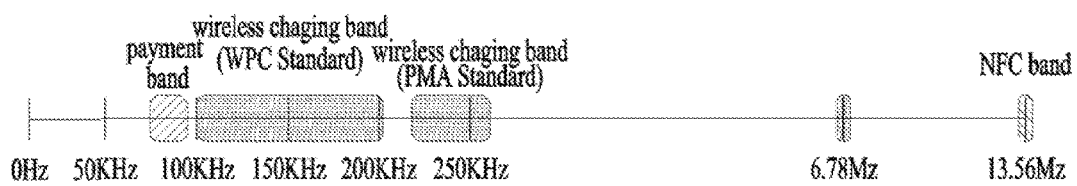
FIG. 6 is a graph showing the frequency bands used in the coil antenna module in accordance with the present disclosure.

FIG. 6 illustrates the frequency ranges used in the mobile payment and the wireless charging. The frequency band used in the NFC or the mobile payment is not wide. In contrast, the wireless charging has to operate in a wide frequency band so as to use the two standards.

As an indicator for indicating the width of the frequency band, there is a Q-factor (Quality factor). The Q-factor is a value showing sharpness of resonance in a resonance circuit. The Q-factor shows a difference between a resonance frequency at which the maximum electric current flows and a resonance frequency at which an electric current as large as 0.71 times of the resonance frequency and it also shows a rate of the resonance frequencies.

As the Q-factor is getting larger, it means that only frequencies at a narrower range are used. For NFC, only frequencies at a specific range are used and there is not difficulty in transmitting and receiving a signal even when the Q-factor is substantially small. Also, the NFC has an advantage of less interference in signals at different specific ranges.

However, so as to use not only WPC standard and PMA standard, the frequency band used in the wireless charging has to be wide to transmit and receive signals at a wide frequency band (from 110 kHz to 280 kHz) mentioned above, so that a resonance circuit having a small Q-factor may be configurated. The Q-factor may be in proportion or reverse proportion to the size of the inductor according to serial connection or parallel connection between the coil and the capacitors provided in the frequency matching circuits 251, 252 and 253 provided in the controller 180.

The resonance frequency may be calculated based on following Mathematical Equation 1. As the inductance (L) is getting smaller, a high frequency signal may be transmitted and received.

$$f_o = \frac{1}{2\pi \cdot \sqrt{L \cdot C}}$$ [Mathematical Equation 1]

The inductance (L) may be varied according to the number of the coil windings. As the number of the coil windings is getting larger, the inductance (L) is getting larger. Accordingly, the number of the coil windings may be increased to gain a large inductance (L) in case of a low frequency signal used in the wireless charging. The number of the first coil windings used in the NFC may be decreased.

The number of the first coil windings is the smallest and the number of the third coil windings is the largest. For example, the number of the first coil 221 windings is 3 to 5 and the number of the second coil 222 windings is 5 to 7. The number of the third coil 223 windings is 10 to 13.

The frequencies may be varied according to the capacitances and resistances of the matching circuits 251, 252 and 253 as well as to the inductances of the first 221 to the third coil 223. However, the embodiment is not limited thereto.

A thick coil may be used as the third coil to move as many electrons as possible when the third coil 223 is located in the magnetic field of the wireless charging.

A terminal 226 is provided in an end of each coil to connect each coil to the controller 180. As shown in FIGS. 3 and 4, the terminals 226 are arranged collectively for easy and convenient connection. For such arrangement, internal ends and external ends of the coils are extended and connected to the terminals 225 arranged collectively.

At this time, the internal end of each coil has to be extended across the spiral arrangement of the coil. The second coil 222 and the third coil 223 arranged in the inner portion have to be extended across the first coil 221 and the second coil 222. Both sides of the insulating sheets 210 may be used not to overlap the line connected to the internal end of the coil and the terminal 226 with the spiral portion of the coil.

The second coil 222 and the first coil 221 formed in a back surface of the insulating sheet 210 shown in FIG. 3 have an omitted spiral portion to avoid the overlapping. A predetermined portion of the first or second coil connected to the coil formed in the rear surface is provided in a front surface of the insulating sheet 210. A line extended from the internal and external ends of the first coil 223 and connected to the controller 180 may be formed, using the front surface of the insulating sheet 210.

In one embodiment shown in FIG. 4, only the portion of the coil not formed in the rear surface of the insulating sheet 210 may be formed in the front surface of the insulating sheet 210. The coil may be symmetrically formed in the rear surface and the front surface of the insulating sheet 210 so that the area of the coil can be increased. The coil formed in the front surface and the coil formed in the rear surface may be connected with each other through the via hole penetrating the insulating sheet 210.

In case of using a flexible printed circuit board, a metallic material is coated on the two surfaces of the insulating sheet and etched to form a coil pattern for the coil antenna module. The metallic material coated on one surface of the insulating sheet is partially etched, not etching all of the coated metallic material, so that the symmetric coil pattern formed in the front and rear surfaces of the insulating sheet may be realized.

The terminals 226 are connected ends of the three coils and accessed to a main board, i.e. the controller 180 when coupled to the mobile terminal 100. The terminals 226 may be dispersed and arranged in the two surfaces of the insulating sheet 210 or arranged in the front surface of the insulating sheet as shown in FIG. 4. In other words, when the coil antenna module 200 is mounted to the mobile terminal 100, the plurality of the terminals 226 may be arranged toward the front surface of the mobile terminal 100. That is to form the terminals 226 in the direction toward the main board so as to facilitate the connection with the main board mounted in the case 101 and 102.

A cut-off switch 257a, 257b and 257c may be disposed between the controller and each of the coils 221, 222 and 223. The cut-off switches 257a, 257b, and 257c may be provided in only one of the coils. The three coils 221, 222 and 223 are arranged close. When an electric current flows to one of the coils arranged close, the other coils could be affected and the activated function(s) could not be executed properly. The cut-off switches 257a, 257b and 257c for connecting the modules 251, 252 and 253 related with the activated functions with the coils 221, 222 and 223 may be used in preventing that.

When the user activates the function to use, the cut-off switches 257a, 257b and 257c may be switched on to connect the coil(s) related to the corresponding function with the controller. When the user switches off the function not to use, the cut-off switches 257a, 257b and 257c may be switched off.

The wireless charging function usually keeps the activated state and the connection state between the wireless charging module 251 and the third coil 223. The mobile payment or NFC function has to operate only after the user authentication for information security. Accordingly, the first coil 221, the NFC (Near Field Communication) module 253, the second coil and the mobile payment module 252 have to keep an OFF state.

When the user activates the mobile payment function, one cut-off switch 257a for connecting the wireless charging module with the first coil is open and switched into the OFF state and another cut-off switch 257b for connecting the mobile payment module 252 with the second coil 222 is closed and switched into an ON state.

Figure 7:
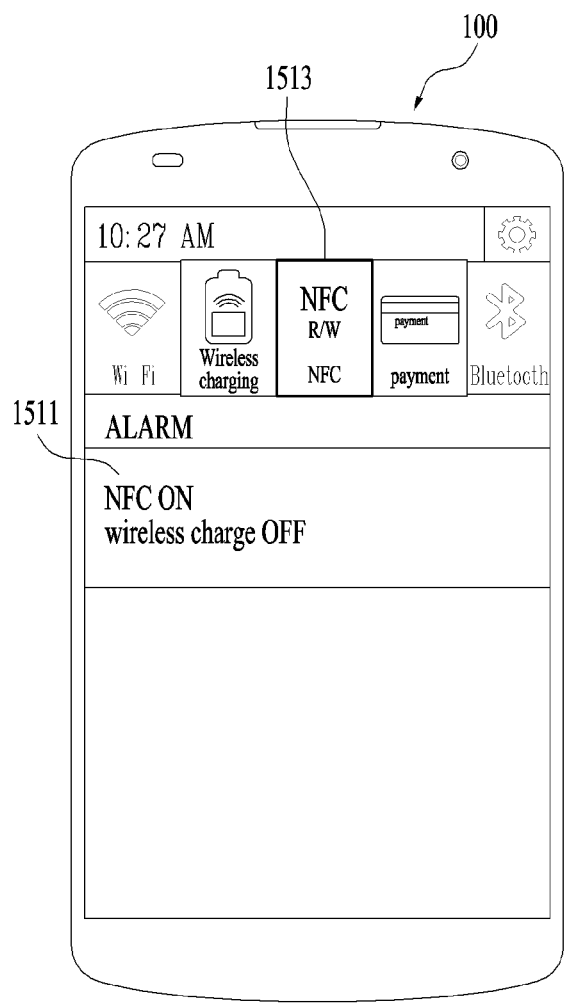
FIG. 7 is a diagram illustrating a display unit configured to display the functions activated in the mobile terminal in accordance with the present disclosure.

FIG. 7 is a diagram illustrating the display unit displaying the activated functions of the mobile terminal in accordance with the present disclosure. the user is provided with a notification via the display unit 151 or the sound output unit 152 to notify the user that a specific function is activated, so that the user may be notified of the connection between the coils 221, 222 and 223 related with the activated one of the NFC, wireless charging and mobile payment functions with the modules 251, 252 and 253.

The notification may be a notifying window 1511 for notifying the user of change of the current state, when the activated function is changed. The notification includes indicators 1513 for indicating the current activated functions.

Figure 8:
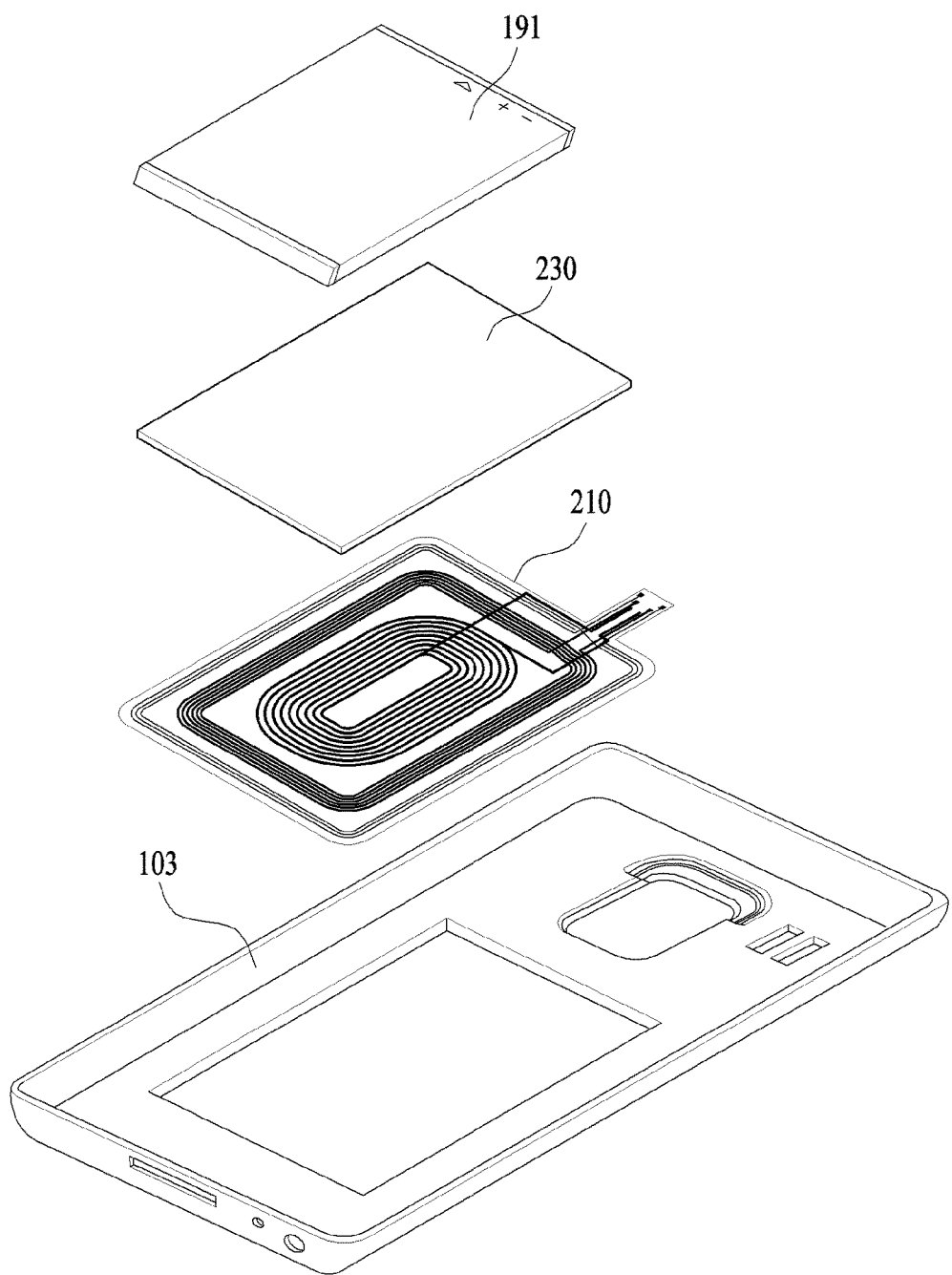
FIG. 8 is an exploded perspective diagram illustrating a rea case and the coil antenna module in accordance with the present disclosure.

FIG. 8 is an exploded perspective diagram illustrating the rear case and the coil antenna module 200 in accordance with the present disclosure. The coil antenna module 200 may further include a magnetic sheet 230. The magnetic sheet 230 is disposed to cover at least one of the coils and configured to reduce the effect of the operating coil on the electronic components mounted therein or the effect of the other components.

The magnetic sheet 230 is a thin sheet formed of a magnetic metallic material and polymer mixture and it reduces the noise of the electronic equipment. The function of the magnetic sheet 230 is varied according to the magnetic permeability of the magnetic metal added to the magnetic sheet 230.

A Ferrite sheet is usually used as the magnetic sheet 230. Ferrite is the generic term for the magnetic ceramic having iron oxide and it has been used as a memory material for a magnetic tape and a computer. Also, Ferrite may be used as an electromagnetic wave absorber.

The Ferrite sheet is the thin sheet formed of the mixture of the metallic powder having Ni, Zn, Mn, Mg, Cu and the like and the paste polymer.

The magnetic sheet 230 has a magnetic permeability variable according to the type of the frequency. When using the same property magnetic metallic material, the thickness of the magnetic sheet is varied according to the frequency to absorb the electromagnetic wave.

Conventionally, one magnetic sheet for the NFC (Near Field Communication) antenna and another magnetic sheet for the wireless charging coil are used. The magnetic sheet used in the NFC (Near Field Communication) antenna has a high magnetic permeability at a high frequency and the magnetic sheet for the wireless charging coil has a high magnetic permeability at a low frequency.

However, the magnetic sheet in accordance with the present disclosure has a high magnetic permeability at all of the frequency of the mobile payment (the low frequency from 50 kHz to 100 kHz), the frequency for the wireless charging (the low frequency from 100 kHz to 200 kHz) and the frequency for the NFC (Near Field Communication) (the high frequency of 13.56 MHz).

Accordingly, the magnetic sheet 230 having a high magnetic permeability at the frequency range from 50 kHz to 14 kHz may be used. The appropriate magnetic permeability ($\mu r$) for removing the noise is 130~190 and the magnetic sheet 230 having the magnetic permeability ($\mu r$) of 130 to 190 at a frequency range from 50 kHz to 14 MHz is used.

The elements or amount of the magnetic material mixed for the magnetic sheet 230 may be varied for the magnetic sheet 230 having the good magnetic permeability at both of the high and low frequencies or the thickness of the magnetic sheet 230 may be physically increased.

For example, a material having a different molecule structure from the material used for the conventional magnetic sheet may be mixed with the magnetic material such as Ferrite or a different amount of the magnetic material may be mixed. Alternatively, the magnetic sheet 230 in accordance with the present disclosure may be formed thicker than the magnetic sheet 230 used for the conventional NFC (Near Field Communication) antenna, so that the transmission and reception efficiency of the low and high frequencies transmitted or received by the coils of the coil antenna module 200.

The mobile payment performed by the mobile payment module 252 and the second coil 222 may be configured to transmit a signal having peculiar identification mobile payment information. When the transmitted signal is spread far, a third person senses the signal and acquires the peculiar identification payment information so that there is concern about the peculiar identification payment information theft. Accordingly, there are needs for a security device to stop the theft.

Figure 9:
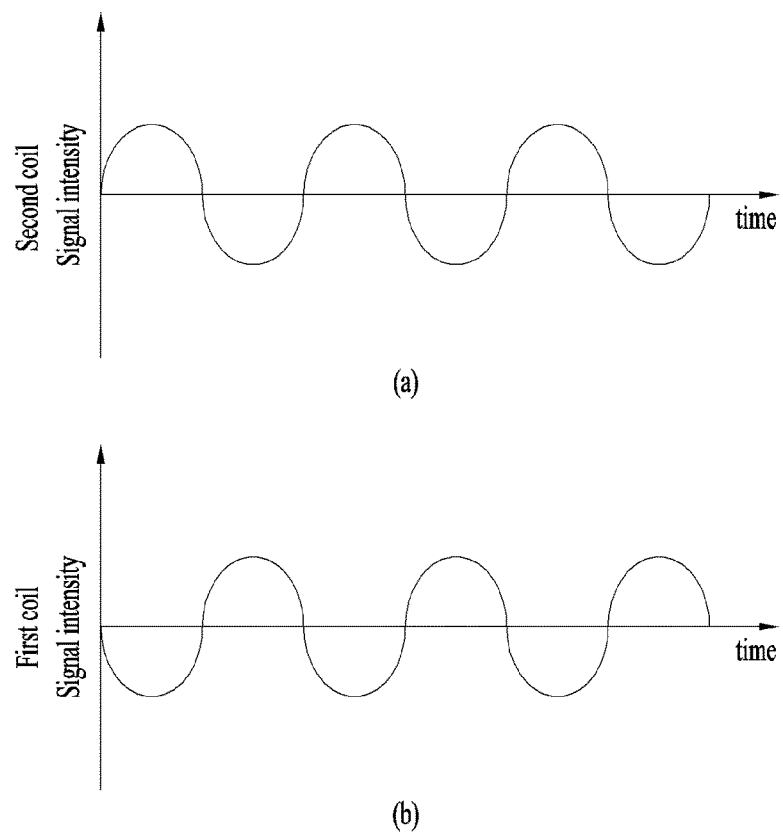
FIGS. 9 and 10 are graphs showing methods for strengthening securing which are used in the coil antenna module in accordance with the present disclosure.

A signal for concealing the signal spread nearby may be generated so as to prevent the signal from being transmitted to the other terminals not to the payment terminal FIG. 9 is a graph to describe a security strengthening method used by the coil antenna module 200 related to the present disclosure. (a) is a signal transmitted from the second coil 222 and (b) is a signal transmitted from the first coil 221 or the third coil 223.

The signal for cancelling the signal transmitted from the second coil 222 may be transmitted from the first coil 221 or the third coil 223. The cancellation signal may be transmitted from the first coil 221 arranged in the more outward portion than the second coil 222, to cancel the outwardly spread signal out of the signals transmitted from the second coil 222.

Figure 10:
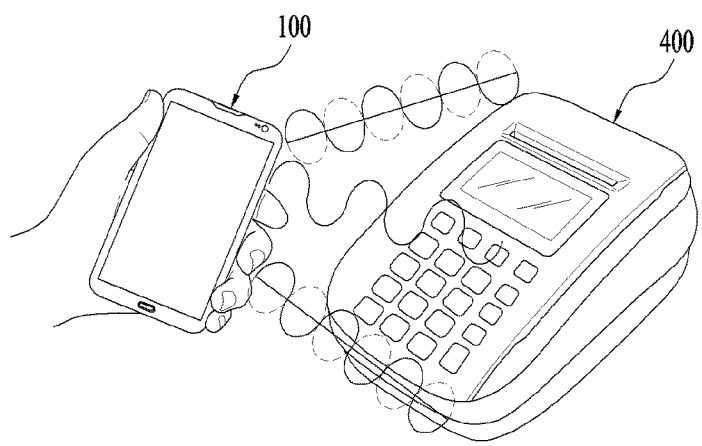

In other words, when the cancellation signal is transmitted from the other coils, the other signals except the signal traveling straight toward the payment terminal 400 as shown in FIG. 10 are cancelled. Accordingly, the disadvantage of the payment information theft generated by acquiring the payment signal transmitted from the second coil near the payment terminal 400.

Figure 11:
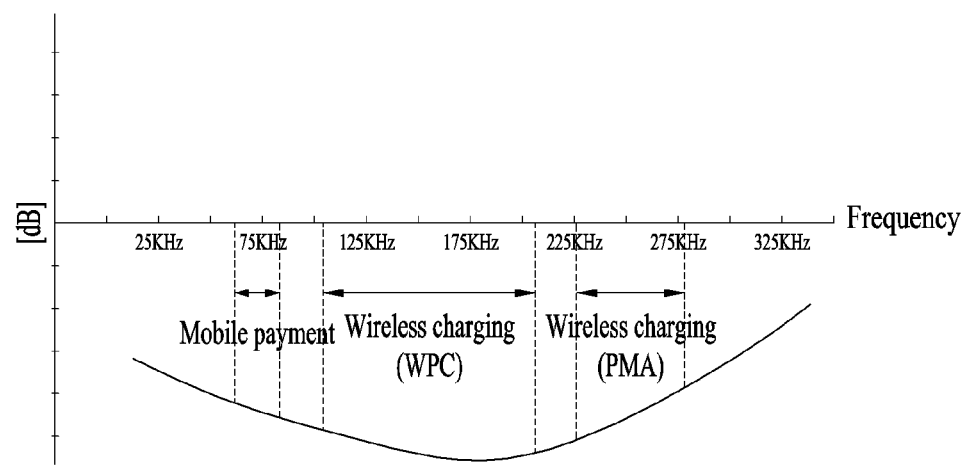
FIG. 11 is a graph showing signal intensity for the frequency band of each coil provided in the coil antenna module in accordance with the present disclosure.
Figure 11:
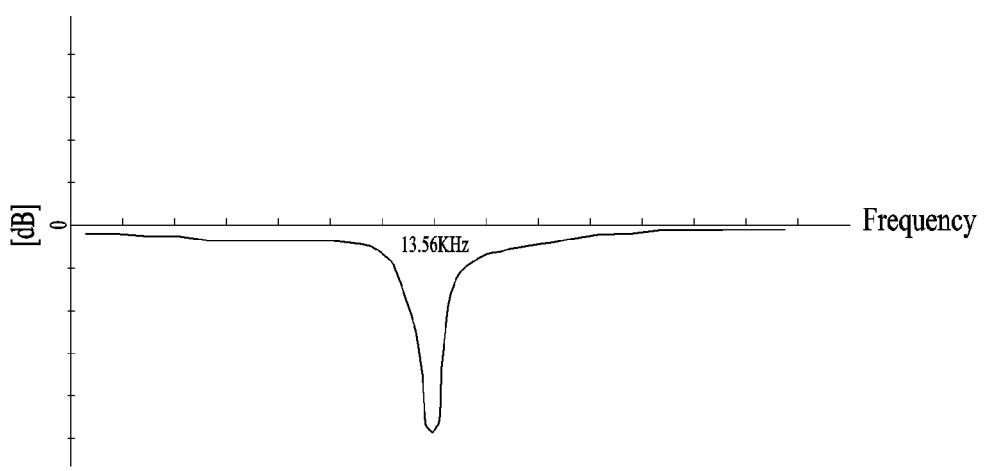

FIG. 11 is a graph showing signal intensity for the frequency band of each coil provided in the coil antenna module 200 in accordance with the present disclosure. (a) of FIG. 11 is the intensity of the signal when the wireless charging is performed after the third coil 223 is connected to the wireless charging module 251. (b) of FIG. 11 shows the intensity of the signal when the first coil 221 connected to the NFC (Near Field Communication) module 253 is operating as the NFC antenna.

When charging the mobile terminal wirelessly as shown in FIG. 11 (a), the resonance frequency band may be set wide enough for the two standards charging mentioned above and the wireless charging module can operate at a wide frequency band. When operating at the wide frequency band range, the Q-factor of the antenna is small. The Q-factor of the antenna operating in a narrow frequency band range shown in FIG. 11 (b) is large.

The third coil 223 and the wireless charging module adjust the inductance and the capacitance to gain the preset charging efficiency in a range from 100 kHz to 200 kHz to set a large Q-factor. In this instance, even the signals near the frequency band width (100 kHz~200 kHz) used for the wireless charging module 251 may be affected.

As shown in FIG. 11 (a), the mobile payment operates in a range of frequencies at 100 kHz or less and the operating third coil 223 might be affected.

Figure 12:
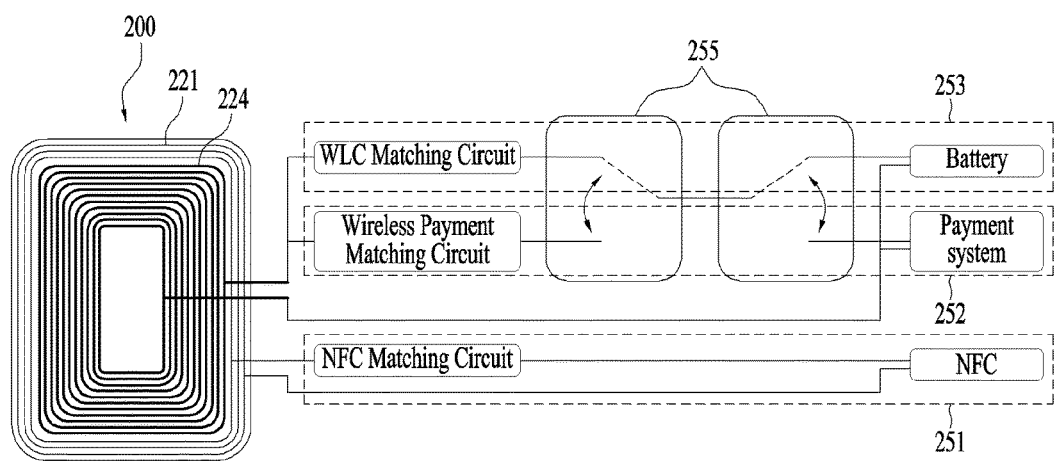
FIGS. 12 and 13 are conceptual diagrams illustrating the circuits provided in a controller and the coil antenna module in accordance with the present disclosure.
Figure 13:
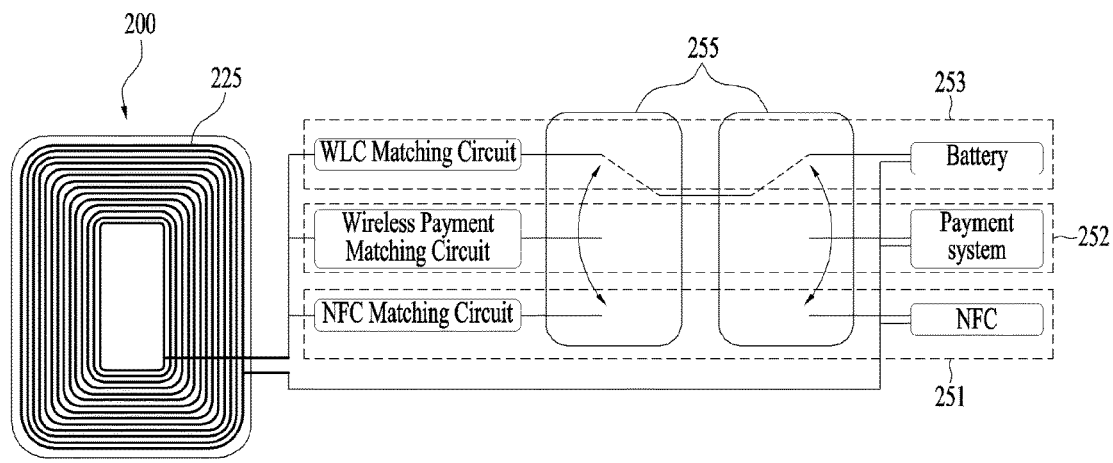

To solve the disadvantage, the second coil 222 and the third coil 223 may be used as one coil. FIGS. 12 and 13 are conceptual diagrams illustrating the circuits provided in the controller 180 and the coil antenna module in accordance with the present disclosure. FIGS. 12 and 13 show an integrated coil 224 formed of the internal end of the second coil 222 and external end of the third coil 223 connected to each other and configured to operate at the low frequency band, and a first coil 221 configured to operate at a low frequency band.

The length of the integrated coil 224 is different from the sum of the second coil 222 and the third coil 223 mentioned in the embodiment. The integrated coil 224 may be used for the mobile payment or the wireless charging by cases. The integrated coil 224 connected to the controller 180 has the wireless charging module 251 and the mobile payment module 252 arranged in parallel, so that it can be selected to the wireless charging module 251 or the mobile payment module 252 selectively.

The integrated coil 224 may be selectively connected to the two modules, using a switch 255. The integrated coil 224 is normally connected to the wireless charging module 251. When the user docks the mobile terminal 100 in a wireless charging device, the mobile terminal 100 is automatically charging. When the user uses the mobile payment function, the user executes a button or an application and inputs a command for the mobile payment to the mobile terminal 100. Then, the position of the switch 255 is changed to transmit a mobile payment signal and the mobile payment module 252 and the integrated coil 224 are connected with each other. In this instance, the sufficient number of the terminals 226 exposed to the coil antenna module 200 is four.

FIG. 13 shows one integrated coil configured of the first through third coils. In this instance, the three functions may be performed by the one integrated coil 225. The frequency band of the signal used for each module is different from the others. The matching circuit adjusts the signals at the different frequency bands and controls signals at a different frequency band to be transmitted to the corresponding module.

When using the NFC function or the mobile payment function in the state where the wireless charging function is always activated in case of using the one integrated coil 225, the switch 255 is operated to switch the modules 251, 252 and 253 connected to the integrated coil 225. In this instance, only the one integrated coil 225 is used and two terminals are sufficient.

Alternatively, a terminal may be further provided in a middle portion of the integrated coil 225 according to the function to use and the position of the integrated coil connected to each module may be changed. When the module is connected to the middle portion of the integrated coil 225, the length of the coil, i.e. a spiral portion used in signal transmission and reception may be adjusted.

Under such the structure, the wireless charging function and the mobile payment function cannot be performed simultaneously and they are not affected by each other. Accordingly, there is no interference between the second coil 222 and the third coil 223.

As mentioned above, the coil antenna module 200 having the plurality of the coils for performing diverse manners of wireless communication in a limited area.

Moreover, the noise generated by the interference between the coils may be removed, using the switch module 255, and the disadvantage of the mobile payment signal exposure may be prevented, using the other coil. Accordingly, the payment security reliability may be enhanced.

As mentioned above, the heat generated in the drive chip of the mobile terminal may be effectively emitted. Only the portion of the mobile terminal, where the drive chip is loaded, may be prevented from being heated when the user is using the mobile terminal and the other components may be prevented from being damaged by the heat. In addition, the shock applied to the frame may not be transferred to the drive chip but be absorbed by the flexible material having a high compressibility. When a particular feature, structure, or characteristic is described in connection with any embodiment, it is submitted that it is within the purview of one skilled in the art to affect such feature, structure, or characteristic in connection with other ones of the embodiments.

What is claimed is:

1. A mobile terminal comprising:
   a first case comprising a battery loading portion;
   a battery located in the battery loading portion;
   a second case coupled to the first case and configured to cover the battery;
   a coil antenna module arranged between the second case and the battery; and
   a controller electrically connected to the coil antenna module and configured to transmit and receive a signal or receive electric power,
   wherein the coil antenna module comprises:
   an insulating sheet having a first surface and a second surface;
   a first coil arranged on at least one of the first surface or the second surface;

a second coil, wherein at least a portion of the second coil is positioned outside of the first coil;

a third coil, wherein at least a portion of the third coil is positioned outside of the second coil; and a magnetic sheet positioned over the first coil, the second coil and the third coil, wherein respective ends of at least one of the first coil, the second coil, or the third coil are positioned on the first surface, wherein a number of windings of the first coil is larger than a number of windings of the third coil, wherein the first coil is used for a wireless charging antenna, the second coil is used for a payment antenna and the third coil is used for a near-field communication (NFC) antenna, wherein a frequency of the wireless charging antenna is lower than a frequency of the NFC antenna, wherein the frequency of the wireless charging antenna and the frequency of the NFC antenna are related to the number of windings of the first coil and the third coil, respectively, and wherein the controller is further configured to communicate payment information associated with a registered credit card to an external terminal through the second antenna in a frequency band of 100 kHz or less.

2. The mobile terminal of claim 1, wherein the controller comprises a frequency matching circuit connected to the ends of at least one of the first coil, the second coil, and the third coil.

3. The mobile terminal of claim 2, wherein the frequency matching circuit matches the first coil with a wider frequency band width than the second coil and the third coil.

4. The mobile terminal of claim 2, wherein the frequency matching circuit matches the first coil with a frequency band of 100 kHz to 300 kHz, the second coil with a frequency band of 100 kHz or less, and the third coil with a frequency band of 13 MHz or more.

5. The mobile terminal of claim 2, wherein the frequency matching circuit comprises a wireless charging module comprising a circuit connected to the first coil, and a near field communication (NFC) module comprising a circuit connected to the third coil, and wherein a Q-factor of the wireless charging module and a Q-factor of the first coil are smaller than a Q-factor of the NFC module and a Q-factor of the third coil.

6. The mobile terminal of claim 1 further comprising a first switch and a second switch respectively coupled to the second coil and the third coil, wherein the second switch is closed when the first switch is open, and wherein the second switch is open when the first switch is closed.

7. The mobile terminal of claim 1, wherein the controller is further configured to control the first coil or the third coil to transmit a cancellation signal configured to cancel a signal transmitted from the second coil, when the signal is transmitted from the second coil.

8. The mobile terminal of claim 1, wherein the magnetic sheet is a Ferrite sheet having a magnetic permeability ($\mu r$) of 130 to 190 at frequencies in a range of 50 kHz to 14 MHz.

9. The mobile terminal of claim 1, wherein the magnetic sheet covers at least one of the first coil, the second coil, or the third coil, and does not cover the ends of the first coil, the second coil, or the third coil.

10. The mobile terminal of claim 1, wherein inductance of the first coil is largest among inductance of the first coil, the second coil, and the third coil.

11. The mobile terminal of claim 1, wherein at least one of the first coil, the second coil, or the third coil comprises a first portion positioned on the first surface and a second portion positioned on the second surface, and wherein the first portion and the second portion are connected with each other.

12. The mobile terminal of claim 11, wherein the first portion and the second portion are symmetrically formed with respect to the insulating sheet.

13. A coil antenna module comprising:

an insulating sheet having a first surface and a second surface;

a first coil arranged on at least one of the first surface or the second surface;

a second coil, wherein at least a portion of the second coil is positioned outside of the first coil;

a third coil, wherein at least a portion of the third coil positioned outside of the second coil; and a magnetic sheet positioned over the first coil, the second coil and the third coil, wherein respective ends of at least one of the first coil, the second coil, or the third coil are positioned on the first surface, wherein a number of windings of the first coil is larger than a number of windings of the second coil and larger than a number of windings of the third coil, wherein the first coil is used for an wireless charging antenna, the second coil is used for a payment antenna and the third coil is used for a near-field communication (NFC) antenna, wherein a frequency of the wireless charging antenna is lower than a frequency of the NFC antenna, wherein the frequency of the wireless charging antenna and the frequency of the NFC antenna are related to the number of windings of the first coil and the third coil, respectively, and wherein the controller is further configured to communicate payment information associated with a registered credit card to an external terminal through the second antenna in a frequency band of 100 kHz or less.

14. The coil antenna module of claim 13, wherein the ends of the first coil, the second coil, and the third coil are attached to a frequency matching circuit.

15. The coil antenna module of claim 14, wherein the frequency matching circuit comprises a wireless charging module comprising a circuit connected to the first coil, and a near field communication (NFC) module comprising a circuit connected to the third coil, and wherein a Q-factor of the wireless charging module and a Q-factor of the first coil are smaller than a Q-factor of the NFC module and a Q-factor of the third coil.

16. The mobile terminal of claim 14, wherein the frequency matching circuit matches the first coil with a wider frequency band width than the second coil and the third coil.

17. The coil antenna module of claim 13, wherein at least one of the first coil, the second coil, or the third coil comprises a first portion positioned on the first surface and a second portion positioned on the second surface, and wherein the first portion and the second portion are symmetrically formed with respect to the insulating sheet.

18. The coil antenna module of claim 13, wherein the first coil or the third coil transmits a cancellation signal configured to cancel a signal transmitted from the second coil, when the signal is transmitted from the second coil.

19. The coil antenna module of claim 13, wherein the magnetic sheet is a Ferrite sheet having a magnetic permeability (μr) of 130 to 190 at frequencies in a range from 50 kHz to 14 MHz.

20. The coil antenna module of claim 13, wherein the magnetic sheet covers at least one of the first coil, the second coil, or the third coil, and does not cover the ends of the first coil, the second coil, or the third coil.

* * * * *